United States Patent
Bristol

(10) Patent No.: US 6,322,215 B1
(45) Date of Patent: Nov. 27, 2001

(54) NON-PROGRESSIVE TRIFOCAL OPHTHALMIC LENS

(76) Inventor: Alexander C. Bristol, 14231 SW. 83 St., Miami, FL (US) 33183

(*) Notice: Subject to any disclaimer, the term of this patent is extended or adjusted under 35 U.S.C. 154(b) by 0 days.

(21) Appl. No.: 09/634,715

(22) Filed: Aug. 7, 2000

(51) Int. Cl.$^7$ .................................................. G02C 7/06
(52) U.S. Cl. ........................ 351/171; 351/168; 351/172
(58) Field of Search ........................... 351/168, 170–172, 351/161, 164

(56) References Cited

U.S. PATENT DOCUMENTS

| | | | |
|---|---|---|---|
| 3,649,236 | * 3/1972 | Rosenbauer | 65/31 |
| 4,055,379 | 10/1977 | Winthrop | 351/177 |
| 4,247,179 | 1/1981 | Daniels et al. | 351/171 |
| 4,580,882 | 4/1986 | Nuchman et al. | 351/161 |
| 4,618,227 | 10/1986 | Bayshore | 351/161 |
| 4,690,524 | * 9/1987 | Daniels et al. | 351/168 |
| 4,796,988 | 1/1989 | Dufour et al. | 351/169 |
| 4,869,588 | * 9/1989 | Frieder et al. | 351/168 |
| 4,890,913 | 1/1990 | De Carle | 351/161 |
| 4,952,048 | 8/1990 | Frieder et al. | 351/177 |
| 5,020,898 | 6/1991 | Townsley | 351/160 R |
| 5,044,742 | 9/1991 | Cohen | 351/161 |
| 5,151,723 | 9/1992 | Tajiri | 351/161 |
| 5,682,223 | 10/1997 | Menezes et al. | 351/161 |
| 5,847,803 | 12/1998 | Gupta et al. | 351/168 |
| 5,864,379 | 1/1999 | Dunn | 351/161 |
| 5,953,099 | 9/1999 | Walach | 351/168 |

* cited by examiner

Primary Examiner—Georgia Epps
Assistant Examiner—Jordan M. Schwartz
(74) Attorney, Agent, or Firm—Bradford E. Kile

(57) ABSTRACT

This invention relates to a novel, non-progressive trifocal ophthalmic lens comprising distance-vision, near-vision and intermediate-vision optic fields. The non-progressive element of the trifocal lens is achieved by blending the transition zones between the different fields of vision. Further, unlike traditional trifocal lenses, the transition zones of the present invention are of uniform width, providing a smooth transition between the different optic fields that can not be easily discerned by a person observing a wearer of said ophthalmic lens.

12 Claims, 2 Drawing Sheets

NON-PROGRESSIVE TRIFOCAL OPHTHALMIC LENS

BACKGROUND OF THE INVENTION

This invention relates to a novel, non-progressive trifocal ophthalmic lens comprising distance-vision, near-vision and intermediate-vision optic fields.

In the past, trifocal ophthalmic lenses have been used for vision correction. Trifocal lenses are used to correct for loss of accommodation, or loss of the ability to focus the eyes, on objects in both the near vision range and intermediate vision range as a result of a decrease in the elasticity of the lens of the eye.

Traditional trifocal ophthalmic lenses have been manufactured from glass or other transparent material that adjusts the focal point of an image of an object for the wearer of the lens. The image of the object is formed using a lens or other transparent material, usually having two polished surfaces to focus rays of light from the object. Both of the polished surfaces of a trifocal lens are usually curved with the front curve (the surface closer to the object) being convex and the back curve (the surface closer to the eye) typically being concave. The specific curvature of trifocal lens surfaces are typically made by grinding and lapping devices selected from a library with varying radii.

The lap devices operate by uniformly grinding out usually spherical or toric optic fields. After the surfaces are polished, the curved lens surfaces focus an image of an object by the process of refraction, in which rays of light bend where the rays enters the lens or leave the lens. With converging trifocal lenses, the rays of light are refracted and converge at a focal point. With traditional trifocal lenses, the polished surfaces can be spherical, i.e., the curved surfaces have a constant radius of curvature, or toric with different base and cross curves. A traditional measure of the power of a trifocal lens is measured in units called diopters, in which a diopter is equivalent to 1 divided by the desired focal length in meters.

Trifocal lenses have three sets of curved surfaces, each having a different radius of curvature. Progressive lenses are designed with a continuously increasing range of focal powers. However, progressive lenses produce several unwanted effects, namely distortion of images, aberrations and peripheral astigmatism. These several unwanted effects of progressive lenses cannot be eliminated. A disadvantage of traditional, trifocal ophthalmic lenses is that the transition zones between the different curved surfaces are discontinuous, i.e. there are sharp discontinuities in curvature between the curvatures of the three separate optic fields resulting in a line or curve that demarcates the different optic fields. As a result, the wearer of traditional trifocal lenses experiences a blurring effect when the wearer's eyes transit through the transition. Thus, these traditional trifocal lenses do not provide a clear, sharp, focused image when one views an object through one optic field and then another optic field, i.e. when one's eyes transit from an intermediate-vision optic field to a near-vision optic field. Moreover, these discontinuities in curvature provide an undesirable cosmetic effect for the wearer of traditional trifocal lenses.

With traditional trifocal lenses, these discontinuities in curvature between the distance-vision, near-vision and intermediate-vision optic fields are clearly undesirable properties. Moreover, the discontinuities in curvature between the three different optic fields are clearly apparent as visible outlines to an observer. All progressive lenses produce undesirable peripheral astigmatism and distortion aberrations for the wearer.

Accordingly, it would be desirable to provide a novel, non-progressive trifocal ophthalmic lens in which the transition zone between the optic fields is blended, i.e. to provide a trifocal lens that eliminates the lines associated with the discontinuities in curvature that characterize traditional trifocal lenses. Moreover, it would be desirable to provide a novel, non-progressive trifocal ophthalmic lens in which the transition zone between the optic fields is facilely formed during manufacture of lens molds.

The objective of a blended segment lens is simply to eliminate the line(s) present in traditional trifocal lenses. This is done by blending the two different curves of adjacent optic zones. The blend area should be controlled to make it as narrow as possible and consistent in width. There is no objective to provide vision in the blend zone.

OBJECTS OF THE INVENTION

It is, therefore, an object of the invention to provide a non-progressive, trifocal ophthalmic lens having three fields of vision without a perceptible external transition between the fields of vision.

It is another object of the invention to provide a non-progressive, trifocal ophthalmic lens comprising a first, generally spherical, distance-vision optic field, a second, generally spherical, near-vision optic field, a third, generally spherical, intermediate-vision optic field, a peripheral zone of blended transition between said first optic field and both said second and third optic fields, and a generally arc-shaped zone of blended transition between said second optic field and said third optic field.

It is a further object of the invention to provide a non-progressive, trifocal ophthalmic lens having three fields of vision without a perceptible external transition between the fields of vision.

It is yet another object of the invention to provide a non-progressive, trifocal ophthalmic lens comprising a first, aspheric, distance-vision optic field, a second, spherical, near-vision optic field, a third, spherical, intermediate-vision optic field, a peripheral zone of blended transition between said first optic field and both said second and third optic fields, which may be facilely produced as a semi-finished or finished lens blank for sale to ophthalmic centers.

BRIEF SUMMARY OF A PREFERRED EMBODIMENT OF THE INVENTION

A preferred embodiment of the invention which is intended to accomplish at least some of the foregoing objects comprises a non-progressive, trifocal ophthalmic lens having three fields of vision without a perceptible external transition between the fields. The non-progressive aspect of the trifocal lens is achieved by blending narrow transition zones between the adjacent fields of vision. Further, unlike traditional trifocal lenses, the transition zones of the present invention are of uniform width, providing a smooth transition between the different optic fields that can not be easily discerned by a person observing a wearer of said ophthalmic lens.

THE DRAWINGS

Other objects and advantages of the present invention will become apparent from the following detailed description of preferred embodiments thereof, taken in conjunction with the accompanying drawings, wherein.

Figure 3:
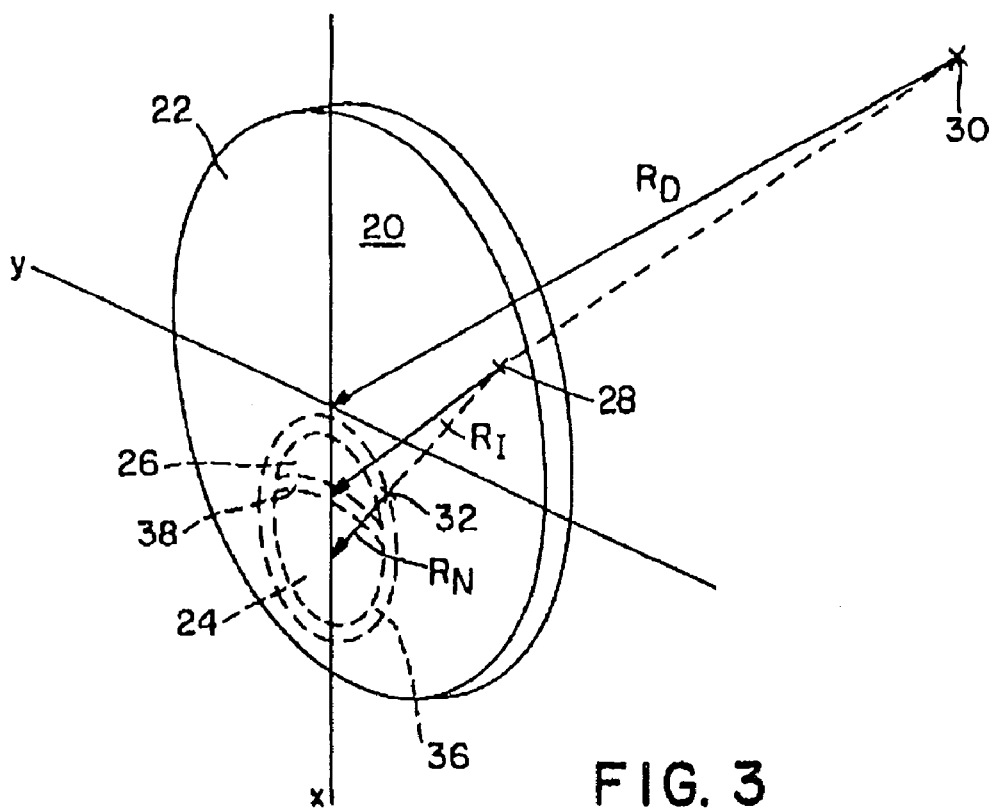
Figure 4:
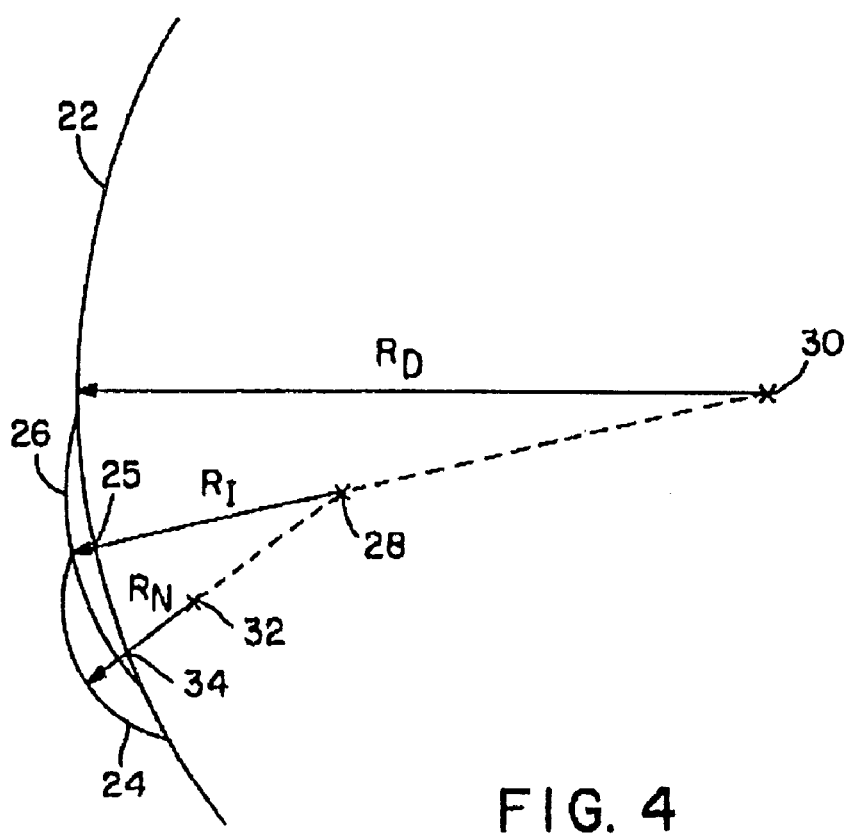

FIG. 3 is a schematic of a trifocal lens, viewed from a perspective angle, that shows a distance-vision optic field, a near-vision optic field and an intermediate-vision optic field, and the radius of curvature for the distance-vision optic field ($R_D$), the radius of curvature for the near-vision optic field ($R_N$), and the radius of curvature for the intermediate-vision optic field ($R_I$), wherein said near-vision and intermediate-vision optic fields each lie within and each has a surface area positioned beneath a central line of sight of said distance-vision optic field;

FIG. 4 is a lateral, cross-sectional view of a trifocal lens, showing the radius of curvature for the distance-vision optic field ($R_D$), the radius of curvature for the near-vision optic field ($R_N$), and the radius of curvature for the intermediate-vision optic field ($R_I$).

DETAILED DESCRIPTION

Context of the Invention

Figure 1:
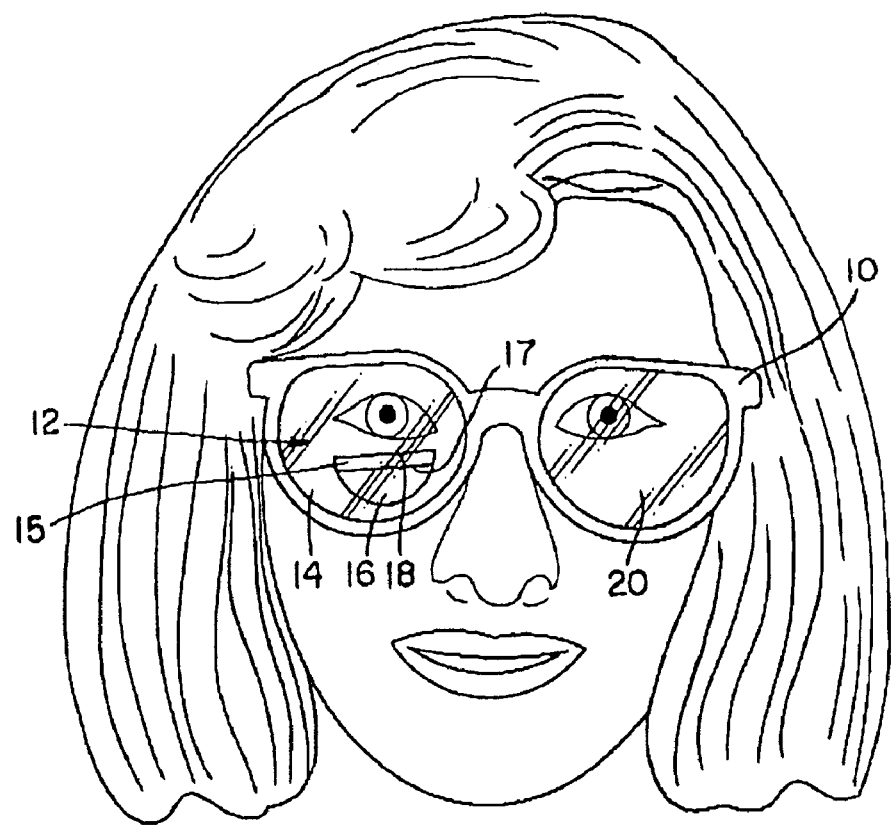
FIG. 1 is a portrait view of a person wearing trifocal glasses, wherein said glasses have a conventional trifocal lens on the wearer's right side and a non-progressive trifocal ophthalmic lens on the wearer's left side.

Referring now to the drawings wherein, like numerals indicate like parts, and initially to FIG. 1, there will be seen a portrait view of a person wearing trifocal glasses 10. In this view a conventional trifocal lens is shown on the wearer's right side and a non-progressive trifocal ophthalmic lens of the subject invention on the wearer's left side. The conventional lens 12 includes a distance field of view 14 comprising a major portion of the lens, a smaller intermediate vision segment 15 positioned below a central line of sight of the lens, and a near vision segment 16 positioned below a central line of sight of the lens. The intermediate vision field and near vision field come into view by a wearer as her eyes transit downwardly toward an intermediate object or a near object, respectively, such as for reading. A sharp line of transition 17 exists between the near and intermediate fields which is visible to both third parties and the wearer of the lens. In addition, a sharp line of transition 18 exists between the distance focal field and both the near and intermediate fields which is visible to both third parties and the wearer of the lens. Such sharp lines of demarcation clearly identify the wearer of the lens as being accommodated for presbyopia, which is frequently associated with age and is cosmetically undesirable.

The present invention relates to a non-progressive trifocal ophthalmic lens 20 in which there is no perceptible external transition between the different fields of vision for a person observing the wearer of the lens. Referring now to the wearer's left and observer's right, a trifocal lens in accordance with the subject invention is shown containing the same prescriptive distance, near and intermediate optic fields only with a non-progressive transition between the three fields of vision. The wearer of the left eye lens is able to detect an image. However, for an observer of one wearing the lens, the trifocal lens of the present invention appear as a single vision product.

Figure 2:
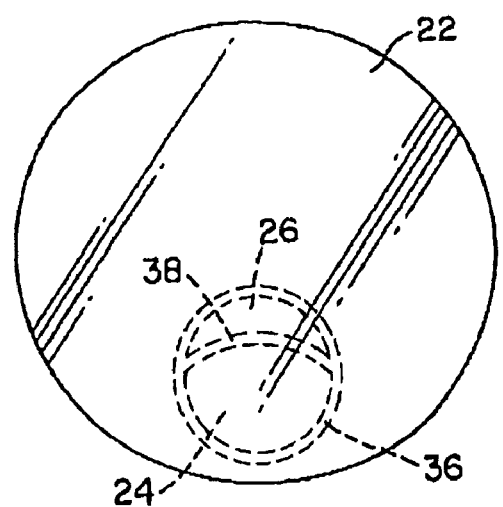
FIG. 2 is a schematic of a trifocal lens, viewed from the front angle, that shows a distance-vision optic field and a near-vision optic field and an intermediate-vision optic field, wherein said near-vision and intermediate-vision optic fields each lie within and each has a surface area positioned beneath a central line of sight of said distance-vision optic field.

Referring now to FIG. 2 there will be seen a schematic of a non-progressive, trifocal ophthalmic lens viewed from the front angle, having three fields of vision without a perceptible external transition between the fields of vision, comprising a distance-vision optic field 22, a near-vision optic field 24, and an intermediate-vision optic field 26, wherein said near-vision and intermediate-vision optic fields each lie within and have surface areas positioned beneath a central line of sight of said distance-vision optic field.

FIG. 2 also depicts a peripheral zone of blended transition 36 between the distance-vision and both the near-vision and intermediate-vision optic fields. The peripheral zone 36 has a uniform width and a curvature intermediate to the curvature of the distance-vision and both the near-vision and intermediate-vision optic fields. Said peripheral zone 36 is operable for providing a smooth transition between said distance-vision optic field and both said near-vision and intermediate-vision optic fields that can not be easily discerned by a person observing a wearer of said ophthalmic lens. In a further embodiment, said peripheral zone 36 has a uniform width of not less than 1 mm or not greater than 3 mm, or alternatively a uniform width of 2 mm.

FIG. 2 also depicts a generally arc-shaped zone of blended transition 38 between said near-vision and intermediate-vision optic fields, said arc-shaped zone 38 having a uniform width and a curvature intermediate to the curvature of said near-vision and intermediate-vision optic fields, said arc-shaped zone being operable for providing a smooth transition between said near-vision and intermediate-vision optic fields that can not be easily discerned by a person observing a wearer of said ophthalmic lens. In a further embodiment, said generally arc-shaped zone has a uniform width of not less than 1 mm or not greater than 3 mm, or alternatively a uniform width of 2 mm.

Referring now to FIG. 3 there will be seen a schematic of a non-progressive, trifocal ophthalmic lens 20 having three fields of vision without a perceptible external transition between the fields of vision, viewed from a perspective angle. The trifocal lens comprises a first, distance-vision optic field 22, a second, near-vision optic field 24, and a third, intermediate-vision optic field 26, wherein the near-vision optic field 24 and intermediate-vision optic field 26 lie within the distance-vision optic field 22. The second optic field 24 and third optic field 26 each have a surface area less than said first optic field 22. Said first optic field 22 has a first radius of curvature $R_D$ substantially along an intended distance-vision line of sight suitable for correction of the far vision of a wearer of said ophthalmic lens. Said second optic field 24 has a second radius of curvature $R_N$ substantially along an intended near-vision line of sight and shorter than the first radius of curvature $R_D$ of said first optic field, and suitable for correction of the near vision of a wearer of said ophthalmic lens. Said third optic field 26 has a third radius of curvature $R_I$ substantially along an intended intermediate-vision line of sight and shorter than the first radius of curvature $R_D$ of said first optic field and longer than the second radius of curvature $R_N$, and suitable for correction of the intermediate vision of a wearer of said ophthalmic lens.

FIG. 3 also depicts a peripheral zone of blended transition 36 between the distance-vision and both the near-vision and intermediate-vision optic fields. The peripheral zone 36 has a uniform width and a curvature intermediate to the curvature of the distance-vision and both the near-vision and intermediate-vision optic fields. Said peripheral zone 36 is operable for providing a smooth transition between said distance-vision optic field and both said near-vision and intermediate-vision optic fields that can not be easily discerned by a person observing a wearer of said ophthalmic lens. In a further embodiment, said peripheral zone 36 has a uniform width of not less than 1 mm or not greater than 3 mm, or alternatively a uniform width of 2 mm.

FIG. 3 also depicts a generally arc-shaped zone of blended transition 38 between said near-vision and intermediate-vision optic fields, said arc-shaped zone 38 having a uniform width and a curvature intermediate to the curvature of said near-vision and intermediate-vision optic fields, said arc-shaped zone being operable for providing a smooth transition between said near-vision and intermediate-vision optic fields that can not be easily discerned by a person observing a wearer of said ophthalmic lens. In a further embodiment, said generally arc-shaped zone has a uniform width of not less than 1 mm or not greater than 3 mm, or alternatively a uniform width of 2 mm.

Referring to FIG. 4, there will be seen a cross-sectional view of a trifocal lens which depicts the radius of curvature $R_D$ for the distance-vision optic field 22, the radius of curvature $R_N$ for the near-vision optic field 24 and the radius of curvature $R_I$ for the intermediate-vision optic field 26. $R_D$ is longer in distance than $R_N$ and $R_I$. Said near-vision optic field 24 has a radius of curvature $R_N$ shorter than $R_D$ and $R_I$. Said near-vision radius of curvature $R_N$ has a point of origin 32 located on an imaginary radius of curvature line $R_I$ beginning at point 28 and terminating at a point 34, i.e. the center of the near-vision segment 24, wherein $R_N$ extends beyond the extent of said distance-vision radius of curvature $R_D$ when $R_D$ and $R_N$ are colinear extending through the center of said near-vision optic field 24. The third intermediate-vision optic field 26 for correction of the intermediate vision of a wearer of said ophthalmic lens has a surface area less than said distance optic field and near optic field, said intermediate-vision optic field 26 lying within said first optic field beneath a central line of sight of said distance-vision optic field 22, said intermediate vision optic field 26 having a third radius of curvature $R_I$, wherein $R_I$ has a point of origin 28 located on an imaginary first radius of curvature line $R_D$ extending from the origin 30 of said first radius of curvature and projecting to point 25, i.e. the center of the intermediate vision segment 26, and wherein $R_I$ terminates at a point beyond the extent of $R_D$ and more proximate than the extent of $R_N$ when $R_I$ and $R_D$ are colinear extending through the center of said intermediate-vision optic field 26.

The refractive power of the trifocal lens of the present invention is measured in diopters, in which a diopter is equivalent to 1 meter divided by the focal length in meters. The curvatures of the peripheral zone and the generally arc-shaped zone of the trifocal lens are blended to be intermediate between the curvatures of the distance-vision, near-vision and intermediate-vision optic fields. As an example, a typical CR-39 2.50 add 50% C-style trifocal lens will have the following front surface curvatures: distance-vision curve (6.25 diopters; radius=84.8 mm); intermediate-vision curve (7.58 diopters; radius=69.9 mm); and near-vision curve (8.91 diopters; radius=59.5 mm).

COMPARATIVE ANALYSIS

In contrast to traditional trifocal lenses, the non-progressive, trifocal ophthalmic lenses of the present invention comprise transition zones of uniform width and curvatures intermediate to the fields of vision bordering the transition zones. The present invention blends the discontinuous curves between the different optic fields, resulting in a smooth transition between the two curves over a short distance, thereby eliminating the clearly apparent borders present in traditional lenses. These novel transition zones of the present invention provide for the non-progressive aspect of the invention, specifically for providing a smooth transition between the distance-vision, near-vision and intermediate-vision optic fields that can not be easily discerned by a person observing a wearer of said ophthalmic lens.

SUMMARY OF MAJOR ADVANTAGES OF THE INVENTION

The present invention confers several major advantages over traditional, trifocal ophthalmic lenses.

Blended Transition Zone

In contrast to other trifocal ophthalmic lenses, the present invention eliminates the problems associated with progressive ophthalmic lenses in which the peripheral areas to the near vision portion and transition zones are blurred for the wearer of the lenses. Thus, the ophthalmic lenses of the present invention allow a wearer to know when to transition between the distance-vision, near-vision and intermediate-vision optic fields of said ophthalmic lens. The present invention describes a non-progressive trifocal ophthalmic lens that eliminates the problems of visual distortion associated with wearing progressive lenses. Specifically, the lens has a novel blended transition zone of uniform width and intermediate curvature, wherein said transition zone maintains a blended appearance that avoids progressive transition blurring for the wearer. As a result, the transition zones of the lens of the present invention do not produce blurred images when a wearer transits from one optic field to another.

The present invention makes no attempt at creating usable vision in the transition zones between the different optic fields. Therefore, the present invention does not pursue the objectives in traditional lenses known in the art as progressive addition lenses. The blend area of the transition zones of the present invention is confined to a relatively small area around the intersection of different optic fields. The width of the blend area of the present invention may vary depending on the desired properties or requirements of the trifocal lens. At the same time, the lens of the present invention provides improved optics in all areas compared to any progressive type lens, and the present invention has the inherent safety features of improved visibility in the distance-vision optic field.

Ease of Manufacture

Another major advantage of the present invention is the ease of manufacture of the trifocal lenses over traditional, trifocal ophthalmic lenses. The lens of the present invention can be manufactured from any glass or plastic material using any acceptable technique in the art of crafting lenses.

The lenses of the present invention are manufactured using lap devices selected from a library or range of lap devices with varying radii. The lap device works by uniformly grinding out the generally spherical or toric optic fields. The present invention can be used to make any segment style trifocal lenses including round segs, panoptic segs and C-style segs. It has been found that blended trifocals are particularly well adapted to C-style segs. Further, the present invention, i.e. the non-progressive trifocal ophthalmic lenses, is applicable to any dimension segment, for example, a trifocal segment with 28 mm wide and 30 mm high dimensions. The radii of curvature of the different optic fields of the present invention may also vary to meet the requirements of various patient prescriptions for vision-correction.

Moreover, the present invention is applicable to any base curve and any add and intermediate power. In addition, the present invention can be applied to both generally spherical and toric surfaces, and is applicable to lenses made of any lens material commonly used to produce ophthalmic lenses. This includes one-piece glass lenses, plastic lenses, polycarbonate lenses and high index plastic lenses. Those skilled in the art, and familiar with the instant disclosure of the subject invention, may also recognize other additions, deletions, modifications, substitutions, and/or other changes which will fall within the purview of the subject invention and claims.

What is claimed is:

1. A partially finished, or finished, non-progressive, trifocal ophthalmic lens blank having three fields of vision without a perceptible external transition between the fields, said ophthalmic lens comprising:

a first, distance-vision optic field having a first radius of curvature of the exterior surface of the lens suitable for use in correction of the far vision of a wearer of said ophthalmic lens;

a second, near-vision optic field for correction of the near vision of a wearer of said ophthalmic lens having a surface area less than said first optic field and lying within said first optic field beneath a central line of sight of said first distance-vision optic field, said second optic field having a second radius of curvature shorter than the first radius of curvature of said first optic field, said second radius of curvature having a point of origin located on an imaginary first radius of curvature line extending from the origin of said first radius of curvature and projecting toward the center of the near-vision optic field, and said second radius of curvature terminating at a point beyond the extent of said first radius of curvature when a first imaginary radius of curvature line and said second radius of curvature line are colinear extending through the center of said second near-vision optic field;

a third, intermediate-vision optic field for correction of the intermediate vision of a wearer of said ophthalmic lens having a surface area less than said first optic field and said second optic field, said third optic field lying within said first optic field beneath a central line of sight of said first distance-vision optic field, said third optic field having a third radius of curvature shorter than the first radius of curvature of said first optic field and greater than the radius of curvature of said second optic field, said third radius of curvature having a point of origin located on an imaginary first radius of curvature line extending from the origin of said first radius of curvature and projecting toward the center of the intermediate-vision optic field, and said third radius of curvature terminating at a point beyond the extent of said first radius of curvature and more proximate than the extent of said second radius of curvature when a first imaginary radius of curvature line and said third radius of curvature line are colinear extending through the center of said third intermediate-vision;

a peripheral zone of blended transition between said first optic field and said second optic field, said peripheral zone having a uniform width and a curvature intermediate to the curvature of said first optic field and said second optic field, said peripheral zone being operable for providing a smooth transition between said first optic field and said second optic field that can not be easily discerned by a person observing a wearer of said ophthalmic lens, but is sufficiently visible to a wearer of the lens to provide a facile frame of reference of said first and second optic fields of vision; and a generally arc-shaped zone of blended transition between said second optic field and said third optic field, said arc-shaped zone having a uniform width and a curvature intermediate to the curvature of said second optic field and said third optic field, said arc-shaped zone being operable for providing a smooth transition between said second optic field and said third optic field that can not be easily discerned by a person observing a wearer of said ophthalmic lens, but is sufficiently visible to a wearer of the lens to provide a facile frame of reference of said second and third optic fields of vision.

2. A partially finished, or finished, non-progressive, trifocal ophthalmic lens blank as defined in claim 1 wherein:
said peripheral zone of blended transition and said generally arc-shaped zone of blended transition each has a uniform width of not less than 1 mm or not greater than 3 mm.

3. A partially finished, or finished, non-progressive, trifocal ophthalmic lens blank as defined in claim 2 wherein:
said peripheral zone and said generally arc-shaped zone each has a uniform width of 2 mm.

4. A partially finished, or finished, non-progressive, trifocal ophthalmic lens blank having three fields of vision without a perceptible external transition between the fields, said ophthalmic lens comprising:

a first, aspheric distance-vision optic field having a first radius of curvature of the exterior surface of the lens suitable for use in correction of the far vision of a wearer of said ophthalmic lens;

a second, near-vision optic field for correction of the near vision of a wearer of said ophthalmic lens having a surface area less than said first optic field and lying within said first optic field beneath a central line of sight of said first distance-vision optic field, said second optic field having a second radius of curvature shorter than the first radius of curvature of said first optic field, said second radius of curvature having a point of origin located on an imaginary first radius of curvature line extending from the origin of said first radius of curvature and projecting toward the center of the near-vision optic field, and said second radius of curvature terminating at a point beyond the extent of said first radius of curvature when a first imaginary radius of curvature line and said second radius of curvature line are colinear extending through the center of said second near-vision optic field;

a third, intermediate-vision optic field for correction of the intermediate vision of a wearer of said ophthalmic lens having a surface area less than said first optic field and said second optic field, said third optic field lying within said first optic field beneath a central line of sight of said first distance-vision optic field, said third optic field having a third radius of curvature shorter than the first radius of curvature of said first optic field and greater than the radius of curvature of said second optic field, said third radius of curvature having a point of origin located on an imaginary first radius of curvature line extending from the origin of said first radius of curvature and projecting toward the center of the intermediate-vision optic field, and said third radius of curvature terminating at a point beyond the extent of said first radius of curvature and more proximate than the extent of said second radius of curvature when a first imaginary radius of curvature line and said third radius of curvature line are colinear extending through the center of said third intermediate-vision;

a peripheral zone of blended transition between said first optic field and said second optic field, said peripheral zone having a uniform width and a curvature intermediate to the curvature of said first optic field and said second optic field, said peripheral zone being operable for providing a smooth transition between said first optic field and said second optic field that can not be easily discerned by a person observing a wearer of said ophthalmic lens, but is sufficiently visible to a wearer of the lens to provide a facile frame of reference of said first and second optic fields of vision; and a generally arc-shaped zone of blended transition between said second optic field and said third optic field, said arc-shaped zone having a uniform width and a curvature intermediate to the curvature of said second optic field and said third optic field, said arc-shaped zone being operable for providing a smooth transition between said second optic field and said third optic field that can not be easily discerned by a person observing a wearer of said ophthalmic lens, but is sufficiently visible to a wearer of the lens to provide a facile frame of reference of said second and third optic fields of vision.

5. A partially finished, or finished, non-progressive, trifocal ophthalmic lens blank as defined in claim 4 wherein:

said peripheral zone of blended transition and said generally arc-shaped zone of blended transition each has a uniform width of not less than 1 mm or not greater than 3 mm.

6. A partially finished, or finished, non-progressive, trifocal ophthalmic lens blank as defined in claim 5 wherein:

said peripheral zone and said generally arc-shaped zone each has a uniform width of 2 mm.

7. A partially finished, or finished, non-progressive, trifocal ophthalmic lens blank having three fields of vision without a perceptible external transition between the fields, said ophthalmic lens comprising:

a first, distance-vision optic field suitable for use in correction of the far vision of a wearer of said ophthalmic lens;

a second, near-vision optic field suitable for correction of the near vision of a wearer of said ophthalmic lens;

a third, intermediate-vision optic field suitable for correction of the intermediate vision of a wearer of said ophthalmic lens;

a peripheral zone of blended transition between said first optic field and both said second and third optic fields, said peripheral zone having a uniform width and being operable for providing a smooth transition between said first optic field and both said second and third optic fields that can not be easily discerned by a person observing a wearer of said ophthalmic lens, but is sufficiently visible to a wearer of the lens to provide a facile frame of reference of said first and both said second and third optic fields of vision; and a generally arc-shaped zone of blended transition between said second optic field and said third optic field, said arc-shaped zone having a uniform width and being operable for providing a smooth transition between said second optic field and said third optic field that can not be easily discerned by a person observing a wearer of said ophthalmic lens, but is sufficiently visible to a wearer of the lens to provide a facile frame of reference of said second and third optic fields of vision.

8. A partially finished, or finished, non-progressive, trifocal ophthalmic lens blank as defined in claim 7 wherein:

said peripheral zone of blended transition and said generally arc-shaped zone of blended transition each has a uniform width of not less than 1 mm or not greater than 3 mm.

9. A partially finished, or finished, non-progressive, trifocal ophthalmic lens blank as defined in claim 8 wherein:

said peripheral zone and said generally arc-shaped zone each has a uniform width of 2 mm.

10. A partially finished, or finished, non-progressive, trifocal ophthalmic lens blank having three fields of vision without a perceptible external transition between the fields, said ophthalmic lens comprising:

a first, spheric distance-vision optic field having a first radius of curvature of the exterior surface of the lens suitable for use in correction of the far vision of a wearer of said ophthalmic lens;

a second, spheric near-vision optic field for correction of the near vision of a wearer of said ophthalmic lens having a surface area less than said first optic field and lying within said first optic field beneath a central line of sight of said first distance-vision optic field, said second optic field having a second radius of curvature shorter than the first radius of curvature of said first optic field, said second radius of curvature having a point of origin located on an imaginary first radius of curvature line extending from the origin of said first radius of curvature and projecting toward the center of the near-vision optic field, and said second radius of curvature terminating at a point beyond the extent of said first radius of curvature when a first imaginary radius of curvature line and said second radius of curvature line are colinear extending through the center of said second near-vision optic field;

a third, spheric intermediate-vision optic field for correction of the intermediate vision of a wearer of said ophthalmic lens having a surface area less than said first optic field and said second optic field, said third optic field lying within said first optic field beneath a central line of sight of said first distance-vision optic field, said third optic field having a third radius of curvature shorter than the first radius of curvature of said first optic field and greater than the radius of curvature of said second optic field, said third radius of curvature having a point of origin located on an imaginary first radius of curvature line extending from the origin of said first radius of curvature and projecting toward the center of the intermediate-vision optic field, and said third radius of curvature terminating at a point beyond the extent of said first radius of curvature and more proximate than the extent of said second radius of curvature when a first imaginary radius of curvature line and said third radius of curvature line are colinear extending through the center of said third intermediate-vision;

a peripheral zone of blended transition between said first optic field and said second optic field, said peripheral zone having a uniform width and a curvature intermediate to the curvature of said first optic field and said second optic field, said peripheral zone being operable for providing a smooth transition between said first optic field and said second optic field that can not be easily discerned by a person observing a wearer of said ophthalmic lens, but is sufficiently visible to a wearer of the lens to provide a facile frame of reference of said first and second optic fields of vision; and a generally arc-shaped zone of blended transition between said second optic field and said third optic field, said arc-shaped zone having a uniform width and a curvature intermediate to the curvature of said second optic field and said third optic field, said arc-shaped zone being operable for providing a smooth transition between said second optic field and said third optic field that can not be easily discerned by a person observing a wearer of said ophthalmic lens, but is sufficiently visible to a wearer of the lens to provide a facile frame of reference of said second and third optic fields of vision.

11. A partially finished, or finished, non-progressive, trifocal ophthalmic lens blank as defined in claim 10 wherein:

said peripheral zone of blended transition and said generally arc-shaped zone of blended transition each has a uniform width of not less than 1 mm or not greater than 3 mm.

12. A partially finished, or finished, non-progressive, trifocal ophthalmic lens blank as defined in claim 11 wherein:

said peripheral zone and said generally arc-shaped zone each has a uniform width of 2 mm.

* * * * *